(12) United States Patent
Furuyama et al.

(10) Patent No.: US 8,790,048 B2
(45) Date of Patent: Jul. 29, 2014

(54) LOCK HOPPER

(75) Inventors: Kuninori Furuyama, Tokyo (JP);
Masahiro Miya, Tokyo (JP); Ryo Suzuki, Tokyo (JP)

(73) Assignee: J-POWER EnTech, Inc., Tokyo (JP)

( * ) Notice: Subject to any disclaimer, the term of this patent is extended or adjusted under 35 U.S.C. 154(b) by 527 days.

(21) Appl. No.: 13/127,922

(22) PCT Filed: Nov. 11, 2009

(86) PCT No.: PCT/JP2009/069215
§ 371 (c)(1),
(2), (4) Date: May 5, 2011

(87) PCT Pub. No.: WO2010/055861
PCT Pub. Date: May 20, 2010

(65) Prior Publication Data
US 2011/0206469 A1     Aug. 25, 2011

(30) Foreign Application Priority Data
Nov. 14, 2008     (JP) .................................. 2008-292383

(51) Int. Cl.
*B65G 53/46*     (2006.01)
(52) U.S. Cl.
USPC ................ 406/127; 406/31; 406/50; 406/108
(58) Field of Classification Search
USPC ..................... 406/31, 50, 108, 127
See application file for complete search history.

(56) References Cited

U.S. PATENT DOCUMENTS

| 2,946,488 A | * | 7/1960 | Kraft .............................. 222/134 |
| 3,260,285 A | * | 7/1966 | Vogt .................................. 141/8 |
| 4,517,099 A | * | 5/1985 | Breckner ....................... 210/741 |

(Continued)

FOREIGN PATENT DOCUMENTS

| JP | 3-144175 A | 6/1991 |
| JP | 11-137945 A | 5/1999 |
| JP | 2004-10357 A | 1/2004 |
| JP | 2007-246252 A | 9/2007 |

OTHER PUBLICATIONS

International Search Report Dated Jan. 6, 2010.

*Primary Examiner* — Joseph Dillon, Jr.
(74) *Attorney, Agent, or Firm* — Norris McLaughlin & Marcus, P.A.

(57) ABSTRACT

The present invention relates to
A lock hopper (11) provided with air-tight hoppers (A3, B3) arranged side by side with entrance valves (A1, B1) arranged above the air-tight hoppers (A3, B3) and exit valves (A4, B4) arranged below the air-tight hoppers (A3, B3).
The lock hopper (11) performs control which alternately repeats the following states: a state in which granular substances in an upper system are placed in one of the hoppers and gas is supplied into the other hopper to discharge granular substances from the inside of the other hopper to a lower system and a state in which the granular substances in the upper system are placed in the other hopper and gas is supplied to said hopper to discharge granular substances from the inside of said hopper to the lower system.
Also provided is a method of transferring granular substances in an upper system to a lower system by using above-described lock hopper, wherein gas having a volume corresponding to the volume of at least the granular substances to be discharged to the lower system is supplied to a hopper in a state in which the granular substances are being discharged from the hopper to the lower system.

3 Claims, 4 Drawing Sheets

(56) References Cited

U.S. PATENT DOCUMENTS

| | | | |
|---|---|---|---|
| 5,622,484 A * | 4/1997 | Taylor-McCune et al. | 417/393 |
| 6,447,216 B1 * | 9/2002 | Higuchi et al. | 406/27 |
| 6,508,610 B2 * | 1/2003 | Dietrich | 406/13 |
| 6,623,215 B2 * | 9/2003 | Dietrich | 406/197 |
| 6,712,587 B2 * | 3/2004 | Gerhardt et al. | 417/390 |
| 6,929,454 B2 * | 8/2005 | Munzenmaier et al. | 417/403 |
| 6,945,470 B2 * | 9/2005 | Kia et al. | 239/106 |
| 6,953,315 B2 * | 10/2005 | Cartwright | 414/217 |
| 7,144,213 B2 * | 12/2006 | Cartwright | 414/217 |
| 7,163,359 B2 * | 1/2007 | Moser | 406/74 |
| 7,241,080 B2 * | 7/2007 | Klobucar et al. | 406/50 |
| 7,410,329 B2 * | 8/2008 | Simontacchi | 406/98 |
| 7,452,166 B2 * | 11/2008 | von Keudell et al. | 406/98 |
| 7,465,130 B2 * | 12/2008 | Herre et al. | 406/50 |
| 7,731,456 B2 * | 6/2010 | Fulkerson et al. | 406/97 |
| 8,057,129 B2 * | 11/2011 | Kleineidam et al. | 406/50 |
| 8,162,570 B2 * | 4/2012 | Mauchle et al. | 406/13 |
| 8,215,877 B2 * | 7/2012 | Rieger et al. | 406/96 |
| 8,231,310 B2 * | 7/2012 | Sanwald | 406/34 |
| 8,430,640 B2 * | 4/2013 | Mauchle et al. | 417/12 |
| 8,491,226 B2 * | 7/2013 | Kleineidam et al. | 406/50 |
| 2002/0129765 A1 * | 9/2002 | Mauchle | 118/308 |
| 2006/0093442 A1 * | 5/2006 | Kleineidam et al. | 406/10 |
| 2010/0034600 A1 * | 2/2010 | Sanwald | 406/28 |

* cited by examiner

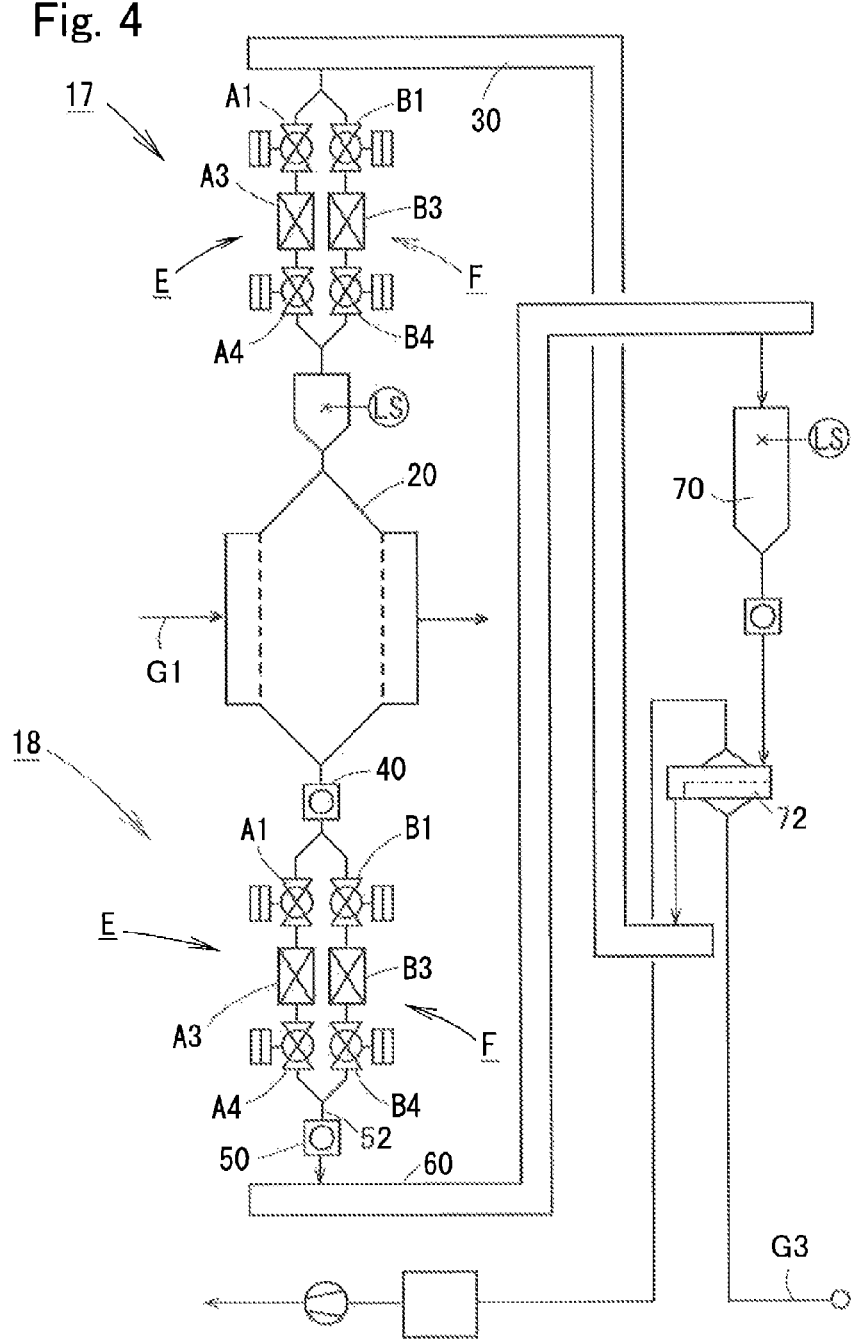

LOCK HOPPER

TECHNICAL FIELD

The present invention relates to a lock hopper which is provided between an upper system and a lower system when a granular substance is allowed to flow down to transfer from the upper system to the lower system. This lock hopper can transfer a granular substance continuously. Moreover, the lock hopper can block the gas flow between the upper system and the lower system and promises a large transfer amount.

BACKGROUND ART

Lock hopper has an entrance valve above the hopper formed air-tightly and an exit valve below the hopper formed air-tightly. In lock hopper, the entrance valve and the exit valve are opened or closed alternately so that both the entrance valve and the exit valve are not in an "open" state simultaneously. As a result, with lock hopper, a granular substance can be transferred from an upper system to a lower system in a state that the flow of gas is blocked between the upper system and the lower system. Here, the upper system and the lower system are systems which conduct the same operation or different operations.

Lock hopper can receive a granular substance from the upper system into the hopper by keeping the entrance valve in an "open" state and the exit valve in a "closed" state. Then, by keeping the entrance valve in a closed state and the exit valve in an open state, the granular substance in the hopper can be discharged to the lower system. Therefore, even when there is a big pressure difference between the upper system and the lower system, the granular substance can be allowed to flow down and be transferred from the upper system to the lower system with hardly being affected by the pressure difference.

Lock hopper is used in supplying coal to a coal gasification furnace or a fuel to a pressurized, fluidized bed boiler. In supplying granular coal to a coal gasification furnace, the granular coal is transferred from an upper system of atmospheric pressure to a lower system having a pressure of about 30 kg/cm². In the transfer of coal, coal of an amount of, for example, the full capacity of hopper is transferred periodically.

There is described, in Patent Literature 1, a dry type, exhaust gas treatment apparatus for conducting an exhaust gas treatment using a granular adsorbent. This treatment apparatus uses a lock hopper. The schematic constitution of this treatment apparatus is shown in FIG. 3. Inside an adsorption tower 20, there is formed a moving bed in which an adsorbent (not shown) is transferred from above to below. An exhaust gas G1 is passed through the moving bed, whereby the harmful substance in the exhaust gas G1 is adsorbed and removed by the adsorbent.

An upper lock hopper 15 is fitted above the adsorption tower 20. An adsorbent is fed into the adsorption tower 20 via the upper lock hopper 15. A lower lock hopper 16 is fitted below the adsorption tower 20. The adsorbent having a harmful substance adsorbed thereon is discharged outside from the adsorption tower 20 via the lower lock hopper 16.

Incidentally, in FIG. 3, LS is a level meter; 70 is a regeneration tower; 72 is a sieve; and G2 and G3 are each a gas.

The lower hopper 16 comprises a hopper A3, an entrance valve A1 provided above the hopper A3, and an exit valve A4 provided below the hopper A3. The adsorbent in the adsorption tower 20 is supplied quantitatively into the hopper A3 by a metering feeder 40.

The adsorbent supplied into the hopper A3 is quantitatively discharged from the hopper A3 by a metering feeder 50. A gas G3 is supplied into the hopper A3 through a gas-introducing valve A6 and is discharged outside through a gas-discharging valve A8. By introducing the dried gas G3 (e.g. nitrogen) into the hopper A3, the hopper A3 inside can be kept in a dry atmosphere.

The lower lock hopper 16 can intermittently discharge the adsorbent outside from the adsorption tower 20 by repeating the following three steps (1), (2) and (3).

(1) The entrance valve A1 is set at "open", the exit valve A4 is set at "closed", the metering feeder 40 is set at "operation", and the metering feeder 50 is set at "stop". By this setting, the adsorbent is discharged from the adsorption tower 20 into the hopper A3.

(2) The entrance valve A1 is set at "closed", the exit valve A4 is set at "closed", the metering feeder 40 is set at "stop", and the metering feeder 50 is set at "stop". In this state, a gas G4 is passed through the hopper A3, whereby the hopper A3 inside is put in a dry state.

(3) The entrance valve A1 is set at "closed", the exit valve A4 is set at "open", the metering feeder 40 is set at "stop", and the metering feeder 50 is set at "operation". By this setting, the adsorbent in the hopper A3 is discharged onto a conveyor 60.

The upper hopper 15 comprises a hopper A3, an entrance valve A1 provided above the hopper A3, and an exit valve A4 provided below the hopper A3. An adsorbent carried by an upper conveyor 30 is quantitatively supplied into the hopper A3. An adsorbent in the hopper A3 is periodically discharged into the adsorption tower 20 through the exit valve A4.

As in the case of the lower lock hopper 16, the hopper A3 comprises a gas-introducing valve A6 and a gas-discharging valve A8. By introducing a gas G3 (e.g. nitrogen) into the hopper A3 through the gas-introducing valve A6, the hopper A3 inside can be kept in a dry atmosphere.

The upper lock hopper 15 can periodically supply the adsorbent into the adsorption tower 20 by repeating the following three steps.

(1) The entrance valve A1 is set at "open", the exit valve A4 is set at "closed", and the conveyor 30 is operated. By this setting, the adsorbent is supplied into the hopper A3.

(2) The entrance valve A1 is set at "closed", the exit valve A4 is set at "closed", and the conveyor 30 is set at "stop". A gas G3 is supplied into the hopper A3, whereby the hopper A3 inside is put in a dry state.

(3) The entrance valve A1 is set at "closed", the exit valve A4 is set at "open", and the conveyor 30 is set at "stop". By this setting, the adsorbent in the hopper A3 is supplied into the adsorption tower 20.

Patent Literature 1 also describes other dry type, exhaust gas treatment apparatus shown in FIG. 4. An upper lock hopper 17 shown in FIG. 4 comprises a lock hopper E and a lock hopper F, arranged side by side. The lock hopper E comprises a hopper A3, an entrance valve A1 and an exit valve A4. The lock hopper F comprises a hopper B3, an entrance valve B1 and an exit valve B4. This upper lock hopper 17 is constituted so that an adsorbent can be transferred downward continuously by using the lock hopper E and the lock hopper F alternately.

A lower lock hopper 18 is constituted in the same manner as the upper lock hopper 17.

No in-depth explanation is given in Patent Literature 1 but the rough function can be conjectured.

Meanwhile, the present inventors made an investigation on the performance of a practical, dry type, exhaust gas treatment apparatus comprising a continuous lock hopper such as mentioned above. As a result, the present inventors found that there was a big difference in flow amount of adsorbent between when an adsorbent is supplied into a hopper and when the adsorbent is discharged from the hopper. That is, it was confirmed that, when the adsorbent was discharged from the hopper, the flow of adsorbent was low, resulting in the significant reduction in flow amount of adsorbent.

Further, when the dry type, exhaust gas treatment apparatus is operated for many hours, the adsorbent undergoes abrasion and is broken depending upon the operation hour, resulting in a decrease in average particle diameter. In this case, the flow amount of adsorbent decreases further. As a result, a relation of (amount supplied into hopper)=(amount discharged from hopper) does not hold, making the lock hopper system non-operable.

In the above practical, dry type, exhaust gas treatment apparatus, the flow amount of the adsorbent was 24 m$^3$/h and the inner diameter of the exit chute was about 150 mm. Easy flow of the adsorbent discharged is achieved by larger inner diameter of exit chute; however, it makes larger the size of exit valve, etc. Consequently, the construction cost of dry type, exhaust gas treatment apparatus and the maintenance cost thereof increase.

Hence, there is desired a lock hopper which is compact and can secure a sufficient transfer amount of adsorbent.

Patent Literature 1: JP-A-1999-137945

DISCLOSURE OF INVENTION

Technical Problem

The present invention aims at providing a lock hopper which is compact in shape and can transfer a granular substance in a large amount. The present invention further aims at providing a lock hopper in which the transfer amount of granular substance does not decrease even when the granular substance has small particle diameters.

Technical Solution

The present inventors made the following investigation in order to clarify the behavior of a granular substance which is discharged from a lock hopper used for continuously flowing down and transferring the granular substance from an upper system to a lower system. That is, the present inventors made an investigation on the behavior of a granular substance, using an experimental apparatus which was similar to the continuous lower lock hopper 18 shown in FIG. 4. As a result, the following knowledge could be obtained.

When a granular adsorbent in a hopper A3 is taken out by a metering feeder 50 and is transferred to a chute 52, the inside of the chute 52 is filled with the adsorbent. Meanwhile, the hopper A3 is formed air-tightly. Since the adsorbent is continuously taken out from the bottom of the chute 52, a gas ascends in the chute 52 from a lower system, in place of the granular substance taken out and enters the hopper A3. The present inventors found that the speed of the gas ascending in the chute 52 was large unexpectedly.

Reconsideration was made on the above-mentioned, actual, dry type, exhaust gas treatment apparatus. The descending speed of the adsorbent in the chute 52 is 0.38 m/s and the relative speed to the ascending gas is two times thereof (0.76 m/s).

Meanwhile, a test of forming a fluidized bed using an adsorbent was conducted, which indicated that the speed (at which the adsorbent started fluidization) was 0.8 to 1.1 m/s. From this result, it was made clear that the descending speed of the adsorbent in the chute 52 was extremely close to the fluidization-starting speed of the fluidized bed.

From the above investigation, it was concluded that the phenomenon that, when a granular substance (e.g. an adsorbent) was discharged from a hopper in a continuous lock hopper, the descending speed (flow amount) of the granular substance decreased, took place because a gas (which ascended in the chute in exchange for the granular substance descending in the exit chute) hindered the descending of the granular substance. It was further clarified that the above phenomenon took place because the gas speed approached the fluidization-starting speed of the granular substance. Furthermore, the reason why the smaller particle diameter of granular substance made more difficult the descending of the granular substance, was that a smaller particle diameter made smaller the fluidization-starting speed. As described above, the present inventors could make clear the reasons for decrease in descending speed of granular substance.

The present invention has been completed based on these findings.

The present invention is as described below.

[1] A lock hopper comprising a lock hopper A having a hopper A3 formed air-tightly, a granular substance entrance pipe A2 connected to the top of the hopper A3, an entrance valve A1 interposed in the granular substance entrance pipe A2, a granular substance exit pipe A5 connected to the bottom of the hopper A3, an exit valve A4 interposed in the granular substance exit pipe A5, a gas-introducing pipe A7 connected to the hopper A3, and a gas-introducing valve A6 interposed in the gas-introducing pipe A7, a lock hopper B having a hopper B3 formed air-tightly, a granular substance entrance pipe B2 connected to the top of the hopper B3, an entrance valve B1 interposed in the granular substance entrance pipe B2, a granular substance exit pipe B5 connected to the bottom of the hopper B3, an exit valve B4 interposed in the granular substance exit pipe B5, a gas-introducing pipe B7 connected to the hopper B3, and a gas-introducing valve B6 interposed in the gas-introducing pipe B7, and a control section C controlling the opening and closing of each of the entrance valves A1 and B1, the exit valves A4 and B4, and the gas-introducing valves A6 and B6, in which lock hopper the following state (1) and state (2) are alternated repeatedly by controlling the control section C:

a state (1) in which the inlet valve A1 is open, the inlet valve B1 is closed, the exit valve A4 is closed, the exit valve B4 is open, the gas-introducing valve A6 is closed, and the gas-introducing valve B6 is open, and a state (2) in which the inlet valve A1 is closed, the inlet valve B1 is open, the exit valve A4 is open, the exit valve B4 is closed, the gas-introducing valve A6 is open, and the gas-introducing valve B6 is closed.

[2] The lock hopper according to [1], wherein the hopper A3 has a level meter A16 inside and the hopper B3 has a level meter B16 inside, the level meter A16 detects that the granular substance has been filled to an intended level in the hopper A3, and sends the detection signal to the control section C, thereby the state (1) is switched to the state (2), and the level meter B16 detects that the granular substance has been filled to an intended level in the hopper B3, and sends the detection signal to the control section C, thereby the state (2) is switched to the state (1).

[3] The lock hopper according to [1], wherein the granular substance exit pipe A5 and the granular substance exit pipe B5 are combined to form a combined pipe T and the combined pipe T has an exit level meter S, and the level meter S detects the absence of the granular substance and the detection signal is sent to the control section C, and this is the necessary condition for said switching of one state to the other state.

[4] A lock hopper comprising a hopper A3 and a hopper B3 both formed air-tightly, an entrance passage-switching valve K, a granular substance-introducing pipe L connected to the entrance of the entrance passage-switching valve K, an upper branch pipe A10 connecting one exit of the entrance passage-switching valve K with the top of the hopper A3, an upper branch pipe B10 connecting the other exit of the entrance passage-switching valve K with the top of the hopper B3, an exit passage-switching valve M, a lower branch pipe A11 connecting the bottom of the hopper A3 with one entrance of the exit passage-switching valve M, a lower branch pipe B11 connecting the bottom of the hopper B3 with the other entrance of the exit passage-switching valve M, a granular substance-discharging pipe N connected to the exit of the exit passage-switching valve M, a gas passage-switching valve W, a gas-introducing pipe X connected to the entrance of the gas passage-switching valve W, a gas branch passage A12 connecting one exit of the gas passage-switching valve W with the hopper A3, a gas branch passage B12 connecting the other exit of the gas passage-switching valve W with the hopper B3, and a control section O controlling the switching of each of the entrance passage-switching valve K, the exit passage-switching valve M and the gas passage-switching valve W, in which lock hopper the following state (1) and state (2) are alternated repeatedly by controlling the control section O:

a state (1) in which the granular substance-introducing pipe L is connected to the upper branch pipe A10, the lower branch pipe A11 is disconnected from the granular substance-discharging pipe N, the gas-introducing pipe X is disconnected from the gas branch passage A12, the granular substance-introducing pipe L is disconnected from the upper branch pipe B10, the lower branch pipe B 11 is connected to the granular substance-discharging pipe N, and the gas-introducing pipe X is connected to the gas branch passage B 12, and a state (2) in which the granular substance-introducing pipe L is disconnected from the upper branch pipe A10, the lower branch pipe A11 is connected to the granular substance-discharging pipe N, the gas-introducing pipe X is connected to the gas branch passage A12, the granular substance-introducing pipe L is connected to the upper branch pipe B10, the lower branch pipe B 11 is disconnected from the granular substance-discharging pipe N, and the gas-introducing pipe X is disconnected from the gas branch passage B 12.

[5] The lock hopper according to [4], wherein the hopper A3 has a level meter A16 inside and the hopper B3 has a level meter B16 inside, the level meter A16 detects that the granular substance has been filled to an intended level in the hopper A3, and sends the detection signal to the control section O, thereby the state (1) is switched to the state (2), and the level meter B16 detects that the granular substance has been filled to an intended level in the hopper B3, and sends the detection signal to the control section O, thereby the state (2) is switched to the state (1).

[6] The lock hopper according to [4], wherein the granular substance-discharging pipe N has an exit level meter S, and the level meter S detects the absence of the granular substance and the detection signal is sent to the control section O, and this is the necessary condition for said switching of one state to the other state.

[7] A method for transferring a granular substance of an upper system to a lower system by using a lock hopper comprising a plurality of air-tight hoppers arranged side by side, each with an entrance valve provided above the air-tight hopper and an exit valve provided below the air-tight hopper, which method is characterized in that there are alternated repeatedly, in each hopper, a step of filling the granular substance of the upper system in the hopper and a step of discharging the granular substance filled in the hopper to the lower system, and in the step of discharging the granular substance filled in the hopper to the lower system, there is supplied, into the hopper in which the granular substance is being discharged to the lower system, a gas of a volume at least corresponding to the volume of the granular substance to be discharged to the lower system.

Advantageous Effects

In the lock hopper of the present invention, when a granular substance is discharged from the hopper, a gas (e.g. nitrogen) is introduced into the hopper; therefore, there is no introduction of a gas of lower system into the hopper. Also, when a granular substance is introduced into the hopper, the gas in the hopper flows toward an upper system in place of the granular substance being introduced and there is no introduction of a gas of upper system into the hopper. Accordingly, there is no gas flow from one system to the other system. Also, there is no gas release outside from the system.

Also, in the lock hopper of the present invention, since each hopper comprises a gas-introducing pipe, a gas (e.g. nitrogen) can be supplied into the hopper through the gas-introducing pipe when a granular substance is discharged from the hopper. The gas fills the space generated in the hopper, when the granular substance is discharged from the hopper. As a result, there is no ascending of the gas of lower system in a chute. The granular substance can descend in the chute without receiving any resistance of the gas ascending in the chute; therefore, the present invention can realize a lock hopper which is compact and can promise a large transfer amount. Further, the present invention can realize a lock hopper which can transfer a granular substance in a large amount even when the granular substance has a small particle diameter.

BRIEF DESCRIPTION OF THE DRAWINGS

FIG. 4 is an assembly drawing showing other example of conventional lock hoppers.

EXPLANATION OF REFERENCE

Figure 1:
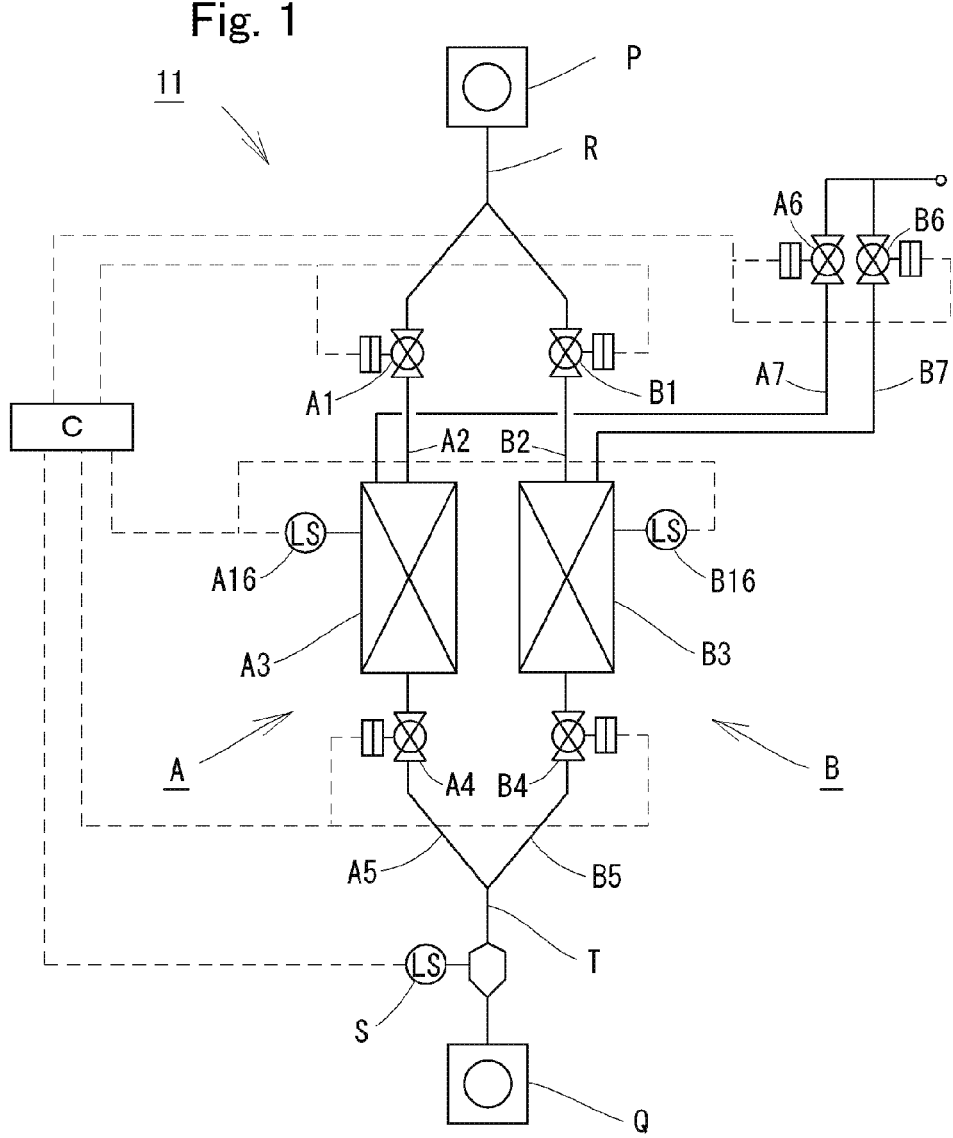
FIG. 1 is an assembly drawing showing the first embodiment of the lock hopper of the present invention.

11, 12, 15, 16, 17, 18: each a lock hopper
20: an adsorption tower 30, 60: each a conveyor
40, 50: each a metering feeder
52: a chute
70: a regeneration tower
72: a sieve
A, B, E, F: each a lock hopper
A1, B1: each an entrance valve
A2, B2: each a granular substance entrance pipe
A3, B3: each a hopper
A4, B4: each an exit valve
A5, B5: each a granular substance exit pipe
A6, B6: each a gas-introducing valve
A7, A8: each a gas-introducing pipe
A8: a gas-discharging valve
A10, B10: each an upper branch pipe
A11, B11: each a lower branch pipe
A12, B12: each a gas branch passage
A16, B16: each a level meter
C, O: each a control section
G1: an exhaust gas
G2, G3: each a gas
K: an entrance passage-switching valve
L, R: each a granular substance-introducing pipe
M: an exit passage-switching valve
N: a granular substance-discharging pipe
P, Q: each a metering feeder
S: an exit level meter
T: a combined pipe
X: a gas-introducing pipe
W: a gas passage-switching valve

BEST MODE FOR CARRYING OUT THE INVENTION

Description is made below on the embodiment of the present invention. FIG. 1 is an assembly drawing of the first embodiment of the present invention.

A lock hopper 11 is constituted by a lock hopper A and a lock hopper B both arranged side by side. The lock hopper 11 alternates the receiving and discharging of a granular substance repeatedly, using two lock hoppers A and B. Further, metering feeders P, Q, etc. are provided between the lock hopper 11 and an upper system or a lower system, whereby the granular substance can be continuously transferred downward. In this lock hopper 11, the two lock hoppers A and B are used alternately, whereby the free movement of a gas between the upper system and the lower system is prevented.

In the lock hopper A, one end of a granular substance entrance piper A2 is connected to the top of a hopper A3 formed air-tightly. An entrance valve A1 is interposed in the granular substance entrance pipe A2.

One end of a granular substance exit pipe A5 is connected to the bottom of the hopper A3. An exit valve A4 is interposed in the granular substance exit pipe A5. One end of a gas-introducing pipe A7 is connected to the top of the hopper A3. A gas-introducing valve A6 is interposed in the gas-introducing pipe A7. Further, the hopper A3 is fitted with a level meter A16 which can detect the presence of a granular substance.

The lock hopper B has the same constitution as the lock hopper A; therefore, reference numbers are given to the corresponding portions of the lock hopper B and the explanation thereof is not made.

A granular substance-introducing pipe R branches and is connected to the granular substance entrance pipe A2 and the granular substance entrance pipe B2. The granular substance exit pipe A5 and the granular substance exit pipe B5 are combined and connected to a combined pipe T. The combined pipe T is fitted with an exit level meter S which can detect the presence of a granular substance.

The lock hopper 11 is provided with a control section C which controls the switching of various valves, etc. The direction of the control section C enables the repeated alternation of the following state (1) and state (2).

The state (1) is a state in which the lock hopper A is receiving a granular substance from an upper system. The entrance valve A1 is "open"; the exit valve A4 is "closed"; and the gas-introducing valve A6 is "closed". The lock hopper B is in a state in which the granular substance is being discharged to a lower system. The entrance valve B1 is "closed"; the exit valve B4 is "open"; and the gas-introducing valve B6 is "open".

The state (2) is a state in which the lock hopper A is discharging the granular substance to a lower system. The entrance valve A1 is "closed"; the exit valve A4 is "open"; and the gas-introducing valve A6 is "open". The lock hopper B is in a state in which a granular substance is being received from an upper system. The entrance valve B1 is "open"; the exit valve B4 is "closed"; and the gas-introducing valve B6 is "closed".

The volume of a gas introduced into the lock hopper A or B is preferably at least a gas volume corresponding to the volume of the granular substance discharged from the lock hopper A or B to a lower system. Specifically, the volume of a gas introduced is preferably at least one time, more preferably 1 to 2 times the volume of the granular substance.

The state (1) and the state (2) may be switched momentarily. However, it is necessary that both the entrance valve A1 and the exit valve A4 are not "open" simultaneously. Or, it is preferred that the timings of "open" and "closed" differ slightly so that both the entrance valve B1 and the exit valve B4 are not "open" simultaneously. Also, the gas introduced from the gas-introducing pipe A7 or B7 may be any gas as long as the gas causes no inconvenience when mixed into a lower system or an upper system. For example, air or nitrogen gas is mentioned.

As the timing of switching the state (1) and the state (2), there may be employed, for example, a timing at which an intended time length is over, when a time length of reception of granular substance or a time length of discharging of granular substance is set beforehand.

In the lock hopper 11 of the present embodiment, a level meter A16 of the hopper A3 and a level meter B16 of the hopper B3 detects the timing that the amount of the granular substance introduced into the hopper A3 or the hopper B3 has reached an intended level; and this timing is taken as the timing of switching the state (1) and the state (2).

That is, when the level meter A16 detects that the granular substance has been filled in the hopper A3 in an intended level, the detection signal is sent to the control section C. The control section C which has received the detection signal, sends a control signal to the entrance valves A1 and B1 and the exit valves A4 and B4. As a result, the lock hopper A and the lock hopper B is switched from the state (1) to the state (2). Also, when the level meter B16 detects that the granular substance has been filled in the hopper B3 in an intended level, the detection signal is sent to the control section C. In the same manner as above, there is conducted the switching of the state (2) to the state (1).

The switching of the state (1) and the state (2) is conducted preferably by confirming that the discharging of the granular substance from the hopper A3 or B3 to a lower system is complete and the hopper A3 or B3 has become empty. The trouble of exit valve A4 or B4 caused by being jammed with granular substance can be avoided. The lock hopper 11 has the exit level meter S in the combined pipe T. When this exit level meter S has become not to detect the presence of granular substance, the detection signal is sent to the control section C and then the switching of the states (1) and (2) is conducted. Thus, in the present embodiment, the reception of detection signal is the necessary condition for switching of one state to the other state.

In the lock hopper 11, when a granular substance is discharged from the hopper A3 (B3), a gas (e.g. nitrogen) is introduced thereinto; therefore, there is no introduction of a gas of lower system into the hopper A3 (B3). After the discharging of the granular substance, the hopper A3 (B3) inside is filled with a gas introduced. Thereafter, when a granular substance is received into the hopper A3 (B3), the gas in the hopper flows toward an upper system in exchange for the incoming granular substance; therefore, there is no introduction of a gas of upper system into the hopper A3 (B3). Accordingly, there is no gas flow from one system to the other system.

Incidentally, when a granular substance is supplied into the hopper A3 or B3 from an upper system (not shown), the granular substance is metered quantitatively by the metering feeder P and falls freely in the granular substance entrance pipe A2 or B2. In the free falling of the granular substance in the granular substance entrance pipe A2 or B2, the distance between granular substance particles is sufficiently large; therefore, the free falling is not hindered by the ascending gas.

In the lock hopper 11, a gas (e.g. nitrogen) is introduced into the hopper A3 (B3) when the granular substance is discharged therefrom, whereby the space in the hopper, generated by the discharging of the granular substance to outside of the hopper is filled by the gas. As a result, there is no ascending of a gas into the hopper A3 (B3) from a lower system through a chute. Since the granular substance can descend in the chute without receiving any gas pressure, the present lock hopper can be made compact and can transfer a large amount of a granular substance. Further, in the present lock hopper, the transfer amount does not decrease even when the granular substance has a small particle diameter.

Next, the second embodiment of the present invention is described with reference to the assembly drawing shown in FIG. 2.

Figure 2:
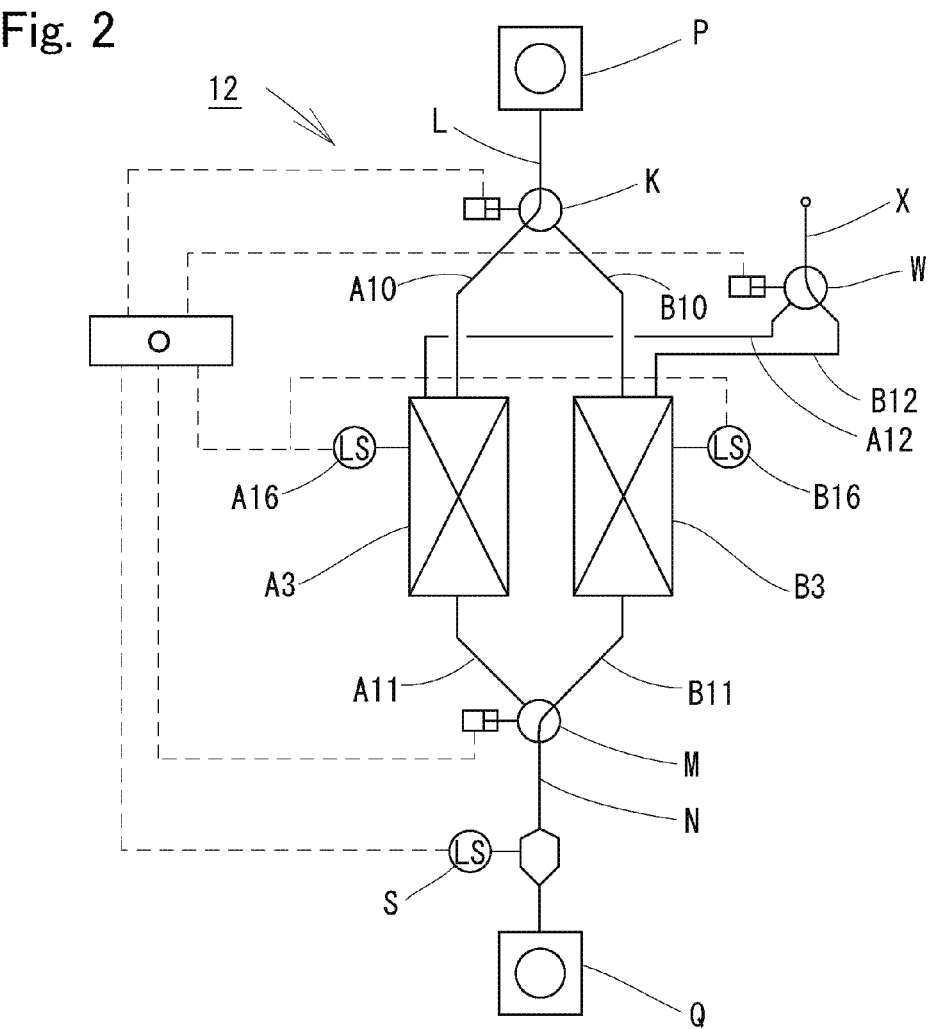
FIG. 2 is an assembly drawing showing the second embodiment of the lock hopper of the present invention.
Figure 3:
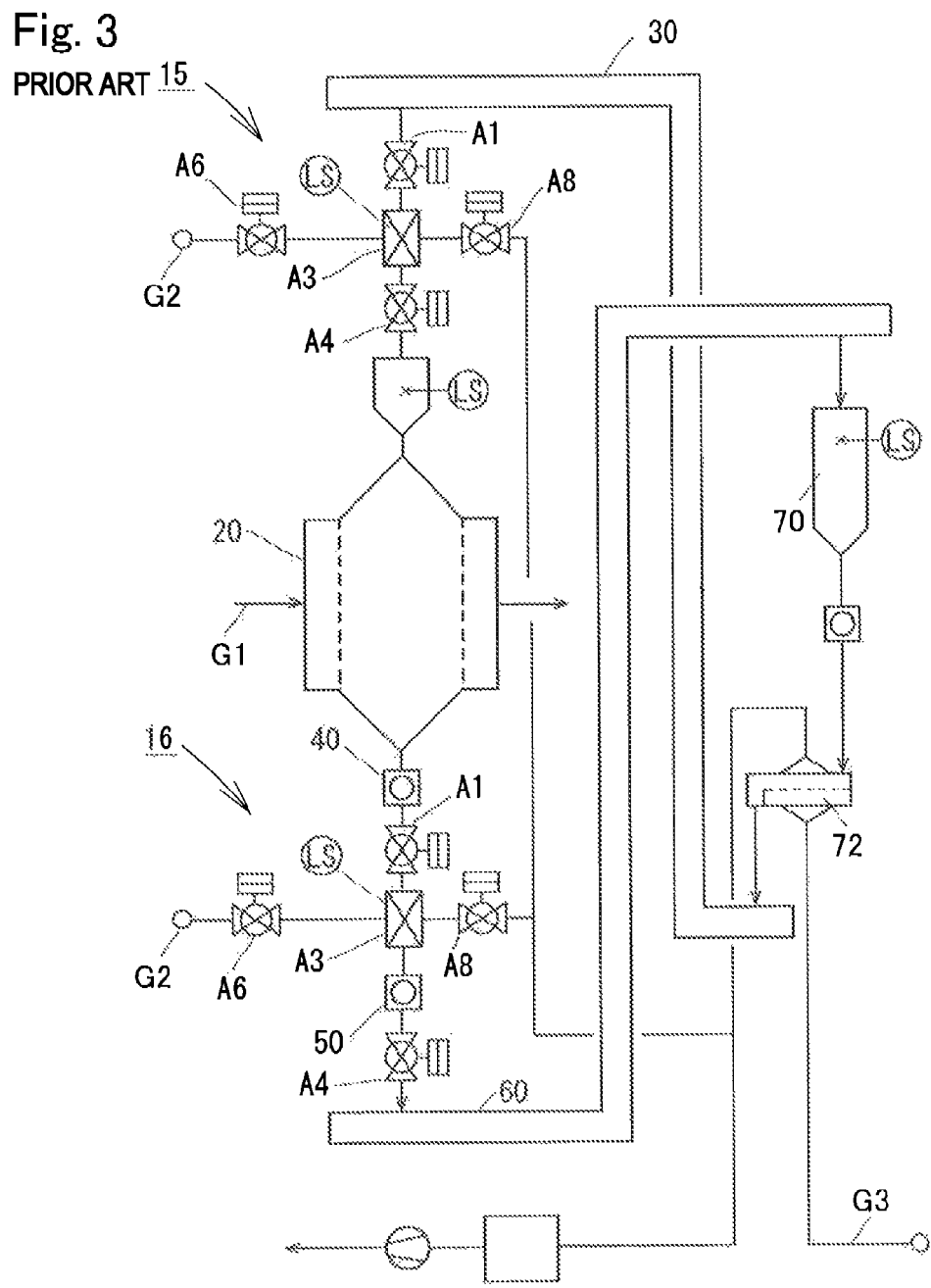
FIG. 3 is an assembly drawing showing an example of conventional lock hoppers.

In FIG. 2, a lock hopper 12 corresponds to a constitution obtained by, in the lock hopper 11 of FIG. 1, replacing the entrance valve A1 and the entrance valve B1 with an entrance passage-switching valve K, replacing the exit valve A4 and the exit valve B4 with an exit passage-switching valve M, and replacing the gas-introducing valve A6 and the gas-introducing valve B6 with a gas passage-switching valve W.

The lock hopper 12 has a hopper A3 and a hopper B3 both formed air-tightly and arranged side by side. An entrance passage-switching valve K is provided above the lock hopper 12 and an exit passage-switching valve M is provided below the lock hopper 12. The entrance of the entrance passage-switching valve K is connected to a granular substance-introducing pipe L. One exit of the entrance passage-switching valve K is connected to the top of the hopper A3 by an upper branch pipe A10. The other exit of the entrance passage-switching valve K is connected to the top of the hopper B3 by an upper branch pipe B10.

The bottom of the hopper A3 is connected to one entrance of the exit passage-switching valve M by a lower branch pipe A11. The bottom of the hopper B3 is connected to the other entrance of the exit passage-switching valve M by a lower branch pipe B11. The exit of the exit passage-switching valve M is connected to a granular substance-discharging pipe N.

Further, a gas-introducing pipe X is connected to the entrance of a gas passage-switching valve W. One exit of the gas passage-switching valve W is connected to the top of the hopper A3 by a gas branch passage A12. The other exit of the gas passage-switching valve W is connected to the top of the hopper B3 by a gas branch passage B12. A metering feeder P, etc. are provided between the granular substance-introducing pipe L and an upper system (not shown). A metering feeder Q is provided between the granular substance-discharging pipe N and a lower system (not shown). The above constitution enables the continuous transfer of a granular substance from the upper system to the lower system.

The hopper A3 is fitted with a level meter A16 for detecting the presence of a granular substance. The hopper B3 is fitted with a level meter B16 for detecting the presence of a granular substance. Further the granular substance-discharging pipe N is fitted with an exit level meter S for detecting the presence of a granular substance.

The lock hopper 12 is provided with a control section O for controlling the switching of various valves, etc. The direction of the control section O enables the repeated alternation of the following state (1) and state (2).

The state (1) is a state in which the hopper A3 is receiving a granular substance from an upper system. The granular substance-introducing pipe L is connected to the upper branch pipe A10; the lower branch pipe A11 is disconnected from the granular substance-discharging pipe N; and the gas-introducing pipe X is disconnected from the gas branch passage A12. The state (1) is also a state in which the hopper B3 is discharging a granular substance to a lower system. The granular substance-introducing pipe L is disconnected from the upper branch pipe B10; the lower branch pipe B11 is connected to the granular substance-discharging pipe N; and the gas-introducing pipe X is connected to the gas branch passage B12.

The state (2) is a state in which the hopper A3 is discharging a granular substance to a lower system. The granular substance-introducing pipe L is disconnected from the upper branch pipe A10; the lower branch pipe A11 is connected to the granular substance-discharging pipe N; and the gas-introducing pipe X is connected to the gas branch passage A12. The state (2) is also a state in which the hopper B3 is receiving a granular substance from an upper system. The granular substance-introducing pipe L is connected to the upper branch pipe B10; the lower branch pipe B11 is disconnected from the granular substance-discharging pipe N; and the gas-introducing pipe X is disconnected from the gas branch passage B12.

As the timing of switching the state (1) and the state (2), there may be employed, for example, a timing at which an intended time length is over, when a time length of reception of granular substance or a time length of discharging of granular substance are set beforehand.

In the lock hopper 12 of the present embodiment, a level meter A16 of the hopper A3 and a level meter B16 of the hopper B3 detects the timing that the amount of the granular substance introduced into the hopper A3 or the hopper B3 has reached an intended level; and this timing is taken as the timing of switching the state (1) and the state (2).

That is, when the level meter A16 detects that the granular substance has been filled in the hopper A3 in an intended level, the detection signal is sent to the control section O. The control section O which has received the detection signal, sends a control signal to the entrance passage-switching valve K, the exit passage-switching valve M, and the gas passage-switching valve W. As a result, the lock hopper 12 is switched from the state (1) to the state (2). Also, when the level meter B16 detects that the granular substance has been filled in the hopper B3 in an intended level, the detection signal is sent to the control section O. As a result, in the same manner as above, the lock hopper 12 is switched from the state (2) to the state (1).

The switching of the state (1) and the state (2) is conducted preferably by confirming that the discharging of a granular substance from the hopper A3 or B3 to a lower system is complete and the hopper A3 or B3 has become empty. The trouble of exit passage-switching valve M caused by being jammed with granular substance can be avoided.

The lock hopper 12 has the exit level meter S in the granular substance-discharging pipe N. When this exit level meter S has become not to detect the presence of granular substance, the detection signal is sent to the control section O and then the switching of the states (1) and (2) is conducted. Thus, in the present embodiment, the reception of detection signal is the necessary condition for switching of one state to the other state.

In the lock hopper 12, when a granular substance is discharged from the hopper A3 (B3), a gas (e.g. nitrogen) is introduced thereinto; therefore, there is no introduction of a gas of lower system into the hopper A3 (B3). After the discharging of the granular substance, the hopper A3 (B3) inside is filled with a gas introduced. Thereafter, when a granular substance is received into the hopper A3 (B3), the gas in the hopper flows toward an upper system in exchange for the incoming granular substance. As a result, there is no introduction of a gas of upper system into the hopper A3 (B3). Accordingly, there is no gas flow from one system to the other system.

In the lock hopper 12, a gas (e.g. nitrogen) is introduced into the hopper A3 (B3) when a granular substance is discharged therefrom, whereby the space in the hopper, generated by the discharging of the granular substance to the outside of the hopper is filled by the gas. As a result, there is no ascending of a gas in a chute. Since the granular substance can descend in the chute without receiving any gas pressure, the present lock hopper can be made compact and can transfer a large amount of a granular substance. Further, in the present lock hopper, the transfer amount does not decrease even when the granular substance has a small particle diameter.

Incidentally, in each of the above embodiments, there has been described a lock hopper having two hoppers arranged side by side. However, the present lock hopper is not restricted thereto and may have any plurality of hoppers arranged side by side.

The invention claimed is:

1. A lock hopper comprising
a lock hopper A having a hopper A3 formed air-tightly, a granular substance entrance pipe A2 connected to the top of the hopper A3, an entrance valve A1 interposed in the granular substance entrance pipe A2, a granular substance exit pipe A5 connected to the bottom of the hopper A3, an exit valve A4 interposed in the granular substance exit pipe A5, a gas-introducing pipe A7 connected to the hopper A3 wherein a volume of gas introduced into the hopper A3 through the gas-introducing pipe A7 is 1 to 2 times the volume of the granular substance discharged to a lower system, and a gas-introducing valve A6 interposed in the gas-introducing pipe A7,
a lock hopper B having a hopper B3 formed air-tightly, a granular substance entrance pipe B2 connected to the top of the hopper B3, an entrance valve B1 interposed in the granular substance entrance pipe B2, a granular substance exit pipe B5 connected to the bottom of the hopper B3, an exit valve B4 interposed in the granular substance exit pipe B5, a gas-introducing pipe B7 connected to the hopper B3 wherein a volume of gas introduced into the hopper B3 through the gas-introducing pipe B7 is 1 to 2 times the volume of the granular substance discharged to a lower system, a gas-introducing valve B6 interposed in the gas-introducing pipe B7, a metering feeder P by which the granular substance of the upper system is supplied to the granular substance entrance pipe A2 and B2, and a metering feeder Q by which the granular substance in the hopper A3 or B3 is supplied to the lower system, and
a control section C controlling the opening and closing of each of the entrance valves A1 and B1, the exit valves A4 and B4, and the gas-introducing valves A6 and B6,
in which lock hopper the following state (1) and state (2) are alternated repeatedly by controlling the control section C, whereby the granular substance in the hopper A3 or B3 is transferred downward to the metering feeder Q alternately through the granular substance exit pipe A5 or B5, wherein
when the granular substance is received into the lock hopper A from the upper system, the gas in the hopper A3 flows toward the upper system in exchange for the incoming granular substance and when the granular substance is discharged from the hopper A3, the above defined volume of gas is introduced to the hopper A3 and
when the granular substance is received into the lock hopper B from the upper system, the gas in the hopper B3 flows toward the upper system in exchange for the incoming granular substance and when the granular substance is discharged from the hopper B3, the above defined volume of gas is introduced to the hopper B3:
a state (1) in which the inlet valve A1 is open, the inlet valve B1 is closed, the exit valve A4 is closed, the exit valve B4 is open, the gas-introducing valve A6 is closed, and the gas-introducing valve B6 is open, and
a state (2) in which the inlet valve A1 is dosed, the inlet valve B1 is open, the exit valve A4 is open, the exit valve B4 is closed, the gas-introducing valve A6 is open, and the gas-introducing valve B6 is dosed.

2. The lock hopper according to claim 1, wherein
the hopper A3 has a level meter A16 inside and the hopper B3 has a level meter B16 inside,
the level meter A16 detects that the granular substance has been filled to an intended level in the hopper A3, and sends the detection signal to the control section C, thereby the state (1) is switched to the state (2), and
the level meter B16 detects that the granular substance has been filled to an intended level in the hopper B3, and sends the detection signal to the control section C, thereby the state (2) is switched to the state (1).

3. The lock hopper according to claim 1, wherein
the granular substance exit pipe A5 and the granular substance exit pipe B5 are combined to form a combined pipe T and the combined pipe T has an exit level meter S, and
the level meter S detects the absence of the granular substance and the detection signal is sent to the control section C, and this is the necessary condition for said switching of one state to the other state.

* * * * *